United States Patent [19]

Nishimoto

[11] Patent Number: 5,071,218
[45] Date of Patent: Dec. 10, 1991

[54] OPTICAL CONNECTOR FERRULE
[75] Inventor: Hiroaki Nishimoto, Osaka, Japan
[73] Assignee: Sumitomo Electric Industries, Ltd., Osaka, Japan
[21] Appl. No.: 665,220
[22] Filed: Mar. 6, 1991
[30] Foreign Application Priority Data
  Mar. 9, 1990 [JP] Japan .................. 2-23994[U]
[51] Int. Cl.$^5$ .................................. G02B 6/36
[52] U.S. Cl. ................................ 385/60; 385/78
[58] Field of Search .......... 350/96.2, 96.21, 96.22

[56] References Cited
U.S. PATENT DOCUMENTS

| | | | |
|---|---|---|---|
| 4,191,447 | 3/1980 | Borsuk | 350/96.2 |
| 4,368,948 | 1/1983 | Despouys | 350/96.2 |
| 4,607,911 | 8/1986 | Rhodes | 350/96.2 |
| 4,674,833 | 6/1987 | Des Forges et al. | 350/96.21 |
| 4,681,398 | 7/1987 | Bailey et al. | 350/96.2 |
| 4,696,537 | 9/1987 | Bauer et al. | 350/96.2 |

OTHER PUBLICATIONS

Crimp & Cleave Optical Connector System for Sumine-t-3200 Fiber-Optic Lan, Nishimoto, Hiroaki et al., pp. 131-136.

Primary Examiner—Frank Gonzalez
Attorney, Agent, or Firm—Cushman, Darby & Cushman

[57] ABSTRACT

An optical connector ferrule for positioning and securing an optical fiber such that the optical fiber is joined with a mating optical fiber; the optical fiber connector ferrule being provided with an insert portion having an end face; the insert portion having an outside diameter D and being formed with a bore for positioning the optical fiber; the bore having a diameter d; wherein a slot having a depth c of 0.005 to 0.050 mm and a width b is formed on the end face such that the following equation is satisfied:

$$(d + 2 \times c) < b < (D/\sqrt{2}).$$

2 Claims, 2 Drawing Sheets

OPTICAL CONNECTOR FERRULE

BACKGROUND OF THE INVENTION

The present invention relates to a so-called crimp and cleave type optical connector ferrule for positioning and securing an optical fiber such that the optical fiber is joined with a mating optical fiber.

FIG. 1 shows a known bonding type optical connector ferrule 20 in which an optical fiber 10 is positioned and secured. In FIG. 1, an optical cord 12, a coated optical fiber 12 and the optical fiber 10 are, respectively, disposed at predetermined positions in a through-hole formed in the known ferrule 20 and are secured by organic adhesive 23. At this time, the optical fiber 10 is secured in the through-hole of the known ferrule 20 by the organic adhesive 23 such that a distal end portion of the optical fiber 10 projects out of an end face of an insert portion 21 of the known ferrule 20. Thus, by polishing the end face of the insert portion 21, a mirror-like joint end face of the optical fiber 10 is obtained.

The known ferrule 20 has such drawbacks that since the optical fiber 10 is secured by using the organic adhesive 23, a long time is required for injection and curing of the organic adhesive 23, an operator is required to have great skill in polishing the end face of the insert portion 21 and working efficiency is low.

Recently in order to improve working efficiency of mounting the optical connector on the optical fiber, a so-called crimp type optical connector ferrule is proposed in which the organic adhesive is not required for securing the optical fiber. Thus, use of the crimp type optical connector ferrule is spreading in optical communications of factory automation and office automation.

A so-called cleave type optical connector ferrule in which polishing is not required for performing mirror finish of the end face of the optical fiber is developed as another means for improving working efficiency of mounting the optical connector on the optical fiber. Combined with this cleave type optical connector ferrule, the crimp type optical connector ferrule is commercially available and put to practical use as a crimp and cleave type optical connector ferrule. The crimp and cleave type optical connector ferrule greatly improves low working efficiency of mounting the optical connector on the optical fiber, which has conventionally constituted an obstacle to widespread use of optical communication systems, and thus, immensely contributes to widespread use of the optical communication systems.

FIG. 2 shows a prior art crimp and cleave type optical connector ferrule 30 into which the optical fiber 10 is inserted. In FIG. 2, the optical cord 12, the coated optical fiber 11 and the optical fiber 10 are disposed at predetermined positions in a through-hole formed in the known ferrule 30, respectively. At this time, the optical fiber 10 is fitted through a compression sleeve 33. By crimping a portion of a ferrule body corresponding, in location, to the compression sleeve 33 from outside of the ferrule body, the compression sleeve 33 and the optical fiber 10 are secured in the prior art ferrule 30. Meanwhile, the optical fiber 10 is secured in the through-hole of the prior art ferrule 30 such that the distal end portion of the optical fiber 10 projects out of an end face of an insert portion 31 of the prior art ferrule 30. When the optical fiber 10 projecting out of the end face of the insert portion 31 is cut off along the end face of the insert portion 31 with a cutting blade, a mirrorlike joint end face of the optical fiber 10 is obtained.

Cutting of the optical fiber 10 is performed as follows. Initially, a cutting blade 34 is applied to an outer periphery of the optical fiber 10 as shown in FIG. 3a and is slid back and forth so as to produce an initial flaw on the optical fiber 10. Then, a tensile stress or a bending stress is applied to the optical fiber 10 so as to cut off the optical fiber 10.

In the above mentioned prior art crimp and cleave type optical connector ferrule 30, the optical fiber 10 or the coated optical fiber 11 is secured in the prior art ferrule 30 by crimping the ferrule body. However, when the prior art ferrule 30 is subjected to thermal impulse or is allowed to stand under high temperatures, coating material of the optical cord 12 is elongated or shrunk. As a result, a thermal stress is generated in the optical fiber 10. Nevertheless, in order to completely prevent any displacement of the end face of the optical fiber from the original position, the crimping force is required to be increased. However, in this case, such undesirable phenomena are unavoidable that life of the crimped portion of the optical fiber 10 up to its fracture decreases due to a local stress caused by crimping and local transmission loss is increased due to crimping.

Therefore, crimping strength is generally determined in view of displacement of the optical fiber from the original position with time, increase of transmission loss due to crimping, life of the crimped portion of the optical fiber up to its fracture. Hence, crimping strength is not necessarily so determined as to set displacement of the optical fiber from the original position with time at zero and thus, the optical fiber is projected or retracted from the joint end face of the ferrule through, for example, 5 to 15 μm with lapse of time.

Meanwhile, in the case where the optical fiber 10 is cut off by producing the minute initial flaw on the outer periphery of the optical fiber 10 along the end face of the insert portion 31, the mirror surface of the optical fiber 10 may be formed with a burr 10a as shown in FIG. 3b.

Therefore, in the above mentioned prior art crimp and cleave type optical connector ferrule, when the opposed optical connector ferrules are coupled with each other or detached from each other through a connector adaptor or the optical connector is coupled with or detached from an O/E or E/O element receptacle, the burrs of the opposed optical fibers collide with each other or the mirror surface of the optical fiber is damaged through its contact with the burr of the mating optical fiber, thereby resulting in extreme deterioration of performance and quality of the optical ferrule connector. Especially, such an inconvenience as described above becomes conspicuous in the optical connector of a type in which an optical reference surface is disposed at the end face of the ferrule such that the ferrule is positioned in the direction of insertion of the ferrule through contact of the end face of the ferrule with that of the mating ferrule.

SUMMARY OF THE INVENTION

Accordingly, an essential object of the present invention is to provide an optical connector ferrule which eliminates the disadvantages inherent in conventional optical connector ferrules.

In order to accomplish this object of the present invention, an optical connector ferrule for positioning and securing an optical fiber such that the optical fiber is joined with a mating optical fiber, according to the present invention is provided with an insert portion having an end face; said insert portion having an outside diameter D and being formed with a bore for positioning the optical fiber; said bore having a diameter d; wherein a slot having a depth c of 0.005 to 0.050 mm and a width b is formed on said end face such that the following equation is satisfied:

$$(d + 2 \times c) < b < (D/\sqrt{2}).$$

BRIEF DESCRIPTION OF THE INVENTION

This object and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
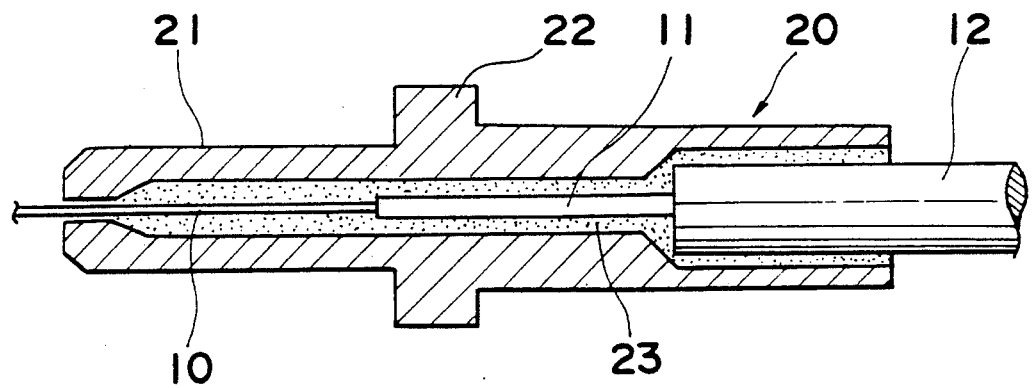
FIG. 1 is a sectional view of a prior art bonding type optical connector ferrule (already referred to)
Figure 2:
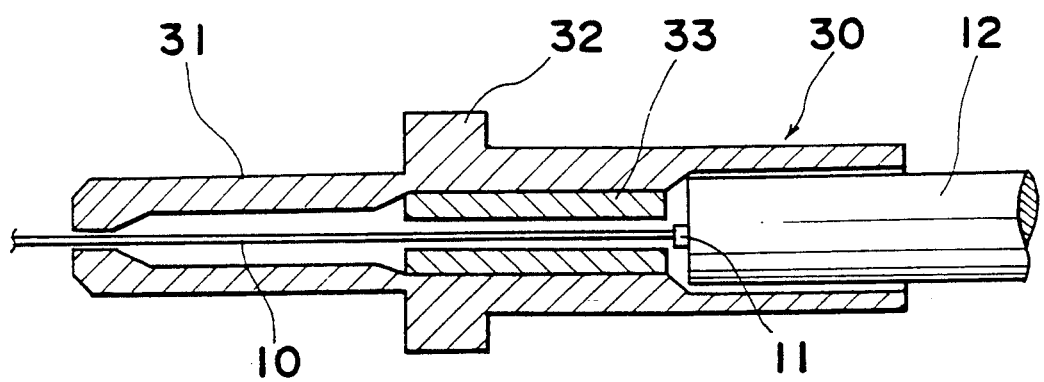
FIG. 2 is a sectional view of a prior art crimp and cleave type optical connector ferrule (already referred to)
Figure 3A:
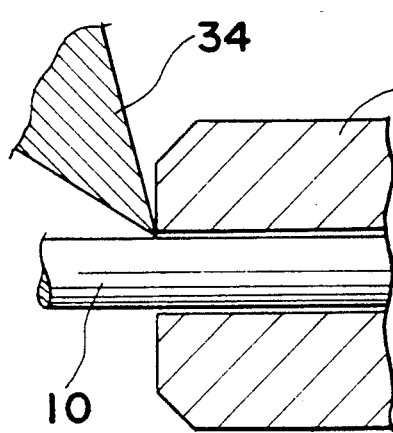
FIG. 3a is a view explanatory of cutting of an optical fiber in the prior art optical connector ferrule of FIG. 2 (already referred to)
Figure 3B:
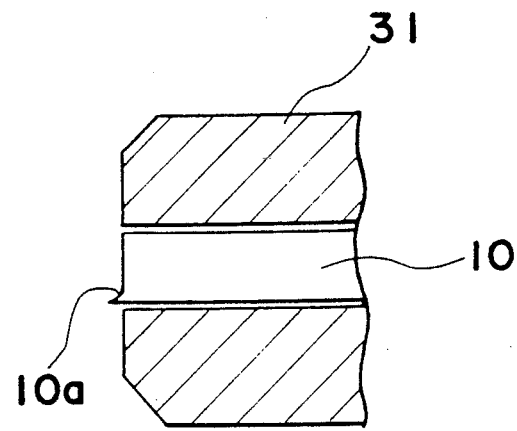
FIG. 3b is a view explanatory of a drawback in cutting of the optical fiber of FIG. 3b (already referred to)
Figure 4:
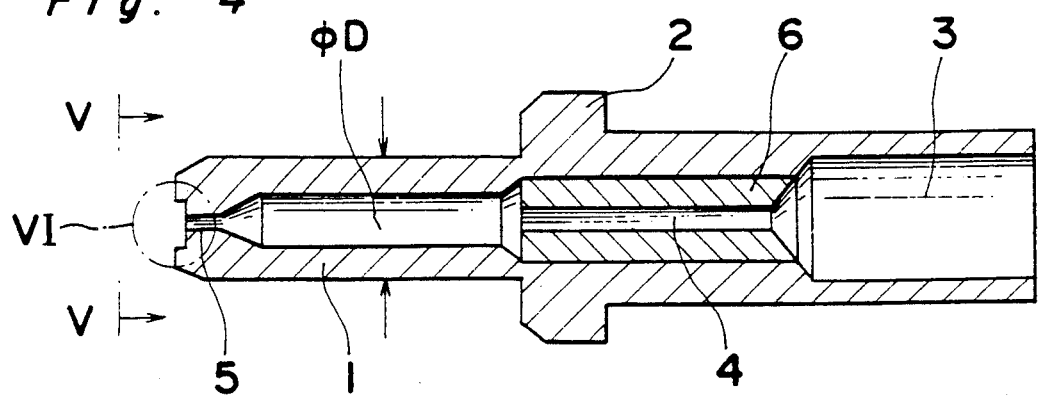
FIG. 4 is a sectional view of an optical connector ferrule according to one embodiment of the present invention.
Figure 5:
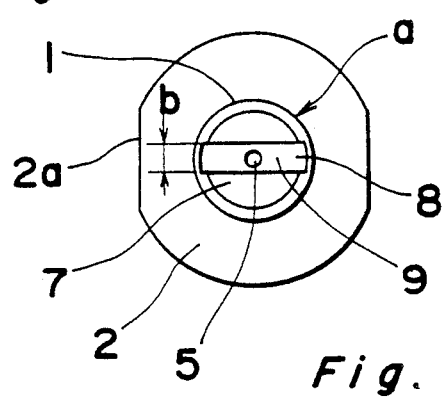
FIG. 5 is an end view of the optical connector ferrule of FIG. 4 as observed in the direction of the arrow V—V in FIG. 4.
Figure 6:
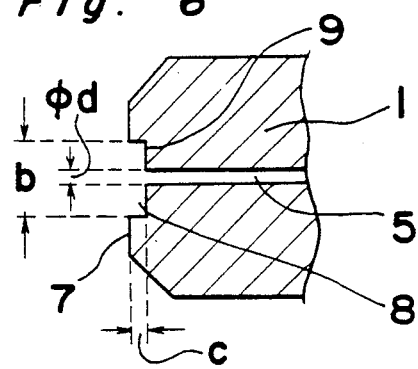
FIG. 6 is an enlarged view of a portion VI in FIG. 4.

Referring now to the drawings, there is shown in FIGS. 4 to 6, an optical connector ferrule according to one embodiment of the present invention. The optical connector ferrule includes an insert portion 1, a flange 2, a hollow 3 for securing an optical cord, a bore 5 for positioning an optical fiber 10, a compression sleeve 6 formed with a through-hole 4 for passing the optical fiber 10 therethrough, an end face 7 and a slot 8 formed on the end face 7. A bottom face of the slot 8 acts as an optical reference surface 9. The insert portion 1 has an outside diameter D, while the bore 5 has a diameter d.

A depth c of the slot 8 ranges from 0.005 to 0.050 mm. Meanwhile, a width b of the slot 8 satisfies the following equation.

$$(d + 2xc) < b < (D/\sqrt{2}) \tag{1}$$

By this arrangement, a mirrorlike end face of the optical fiber 10, i.e. the optical reference surface 9 can be inwardly spaced 0.005 to 0.050 mm from the end face 7 of the optical ferrule connector.

Figure 7:
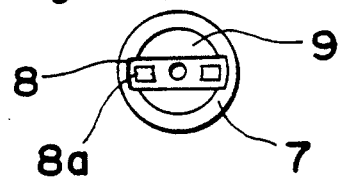
FIG. 7 is a view similar to FIG. 5, particularly showing a modification thereof.

Alternatively, as shown in FIG. 7, a pair of protrusions 8a may be formed in the longitudinal direction of the slot 8.

Figure 9:
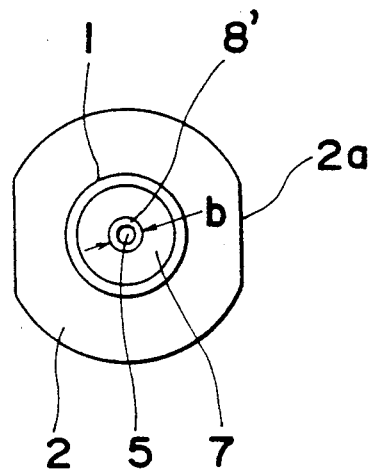
FIG. 9 is a view similar to FIG. 5, particularly showing a second embodiment of the present invention.

In this embodiment, the rectangular slot 8 is formed on the end face 7 of the ferrule and an initial flaw of a desired depth is formed at a point on the side face of the optical fiber 10 by sliding a tip of a cutting blade (not shown) on the optical fiber 10 in parallel with the longitudinal direction of the slot 8 so as to cut off the optical fiber 10. In the case where the initial flaw is formed along the outer peripheral surface of the optical fiber 10 by rotating the tip of the cutting blade around the outer periphery of the optical fiber 10, it will be effective to form a circular recess 8' (FIG. 9) coaxial with the bore 5 and having not only a diameter identical with the width b but the depth c of the slot 8 satisfying the above equation (1), in place of the slot 8.

In the case of the optical connector ferrule formed with the rectangular slot 8 as shown in FIGS. 5 and 7, when the optical fiber 10 is cut off after the optical fiber 10 has been crimped to the optical connector ferrule, a mechanism in which by mounting the ferrule on an optical fiber cutter, the direction of slide of the tip of the cutting blade is automatically so set as to precisely coincide with the longitudinal direction of the slot 8 formed on the end face 7 of the ferrule is necessary for practical use. To this end, it is necessary and effective that a positioning mechanism such as chamfered portions 2a (FIG. 5), grooves, holes, projections, etc. oriented in a specific direction relative to the longitudinal direction of the slot 8 is provided at a portion of the outer periphery of the flange 2 or the side face of the ferrule, which portion should not affect not only insertion accuracy of the ferrule but the crimping mechanism and allows easy provision of the positioning mechanism.

A concrete example of the optical connector ferrule of FIG. 4 is described, hereinbelow. The diameter d of the bore 5 is 0.23 mm. The outside diameter D of the insert portion 1 is 2.499 mm. The depth c of the slot 8 is 0.03 mm, while the width b of the slot 8 is 0.7 mm. In place of a pair of the chamfered portions 2a of FIG. 5, a single cylindrical projection (not shown) of 0.68 mm in height is provided on the outer periphery of the flange 2 so as to extend at right angles to the longitudinal direction of the slot 8. 20 samples A of this optical connector ferrule in which the ferrule body is made of brass and plated with nickel and the compression sleeve 6 is made of copper alloy are manufactured. For comparison, 20 samples B of another optical connector ferrule are manufactured under the same conditions as the samples A except for that the depth c of the slot 8 is zero.

After a rubber boot, a spring, a coupling nut and a portion of other optical connector components have been inserted into each of opposite ends of each of 20 single-fiber cords, for example, "H-PCF" cords (name used in trade and manufactured by Sumitomo Electric Industries, Ltd. of Japan) of 2.2 mm in diameter for an optical fiber of 1 m in length in which a quartz core has a diameter of 200 μm and a hard plastic cladding has a diameter of 230 μm, the samples A (B) are mounted on the opposite ends of the 10 single-fiber cords by crimping and cleaving. Subsequently, each of the samples A (B) is assembled with the components which have been preliminarily inserted into each of the opposite ends of each single-fiber cord and adjustment of the assembly is performed so as to obtain a spring stress of about 1 kgf at the time of insertion of each of the samples A (B). Thereafter, assembly for the optical connector is performed and thus, 20 cords having the interchangeable type optical connectors is obtained.

In the samples A and B, a position of the mirror surface of the optical fiber from the end face 7 of the ferrule is measured by setting a direction oriented outwardly away from the end face 7 at plus (+) direction and is −47 to −19 μm in the samples A and −11 to +12 μm in the samples B.

These samples A and B are placed in a cold thermal impulse testing tank and are subjected to 100 cycles of thermal impulse of −40° C. for 30 min. and 70° C. for 30 min. Furthermore, the samples A and B are allowed to stand at a high temperature of 70° C. and at a high relative humidity of 95% in a constant temperature bath for 100 hr. Thereafter, the samples A and B are allowed to stand at a temperature of 25° C. and at a relative humidity of 50% in the constant temperature bath for 48 hr. Then, the samples A and B are taken out of the constant temperature bath and coupled optical power Pf1 to Pf20 of the samples A and B is measured when each of the samples A and B is inserted into an LED light source provided with an "ST" type receptacle (name used in trade and manufactured by American Telephone and Telegraph Co. of the U.S.) and having a wavelength of 0.85 μm.

Subsequently, the samples A (B) are repeatedly coupled with and detached from each other through an adaptor for relay connection 20 times. Thereafter, by using the above mentioned light source, coupled optical power Pf'1 to Pf'20 of the samples A and B is measured at a temperature of 25° C. As a result, difference ΔPf between Pf and Pf', i.e. ΔPf=Pf−Pf' is obtained as follows.

[Samples A] ΔPf1 to
ΔPf10=Pfk−Pf'k$_{(k=1-10)}$=±0.1 dB

[Samples B] ΔPf11 to
ΔPf20=Pfk−Pf'k$_{(k=11-20)}$+0.2 to +0.7 dB

From the above, it will be seen that change of coupled optical power of the samples A of the present invention due to the repeated coupling and detaching test is rather smaller than that of the samples B.

Figure 8:
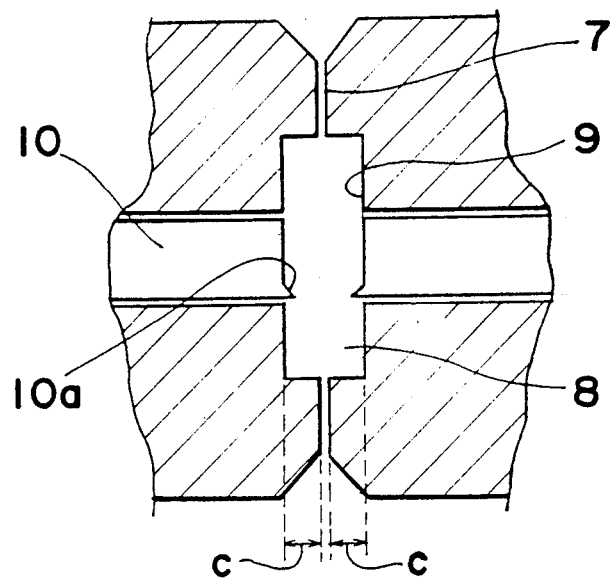
FIG. 8 is a view showing coupling of the opposed optical connector ferrules of FIG. 4.

As is clear from the foregoing description, since the slot is formed on the end face of the optical connector ferrule of the present invention, the optical reference surface is retracted inwardly from the end face of the ferrule. Therefore, the opposed optical connector ferrules of the present invention are coupled with each other as shown in FIG. 8 and thus, do not sustain damage to the optical reference surfaces. Consequently deterioration of optical characteristics of the optical connector ferrule due to the coupling and detaching and long-term thermal stress is quite small and thus, the optical connector of high reliability can be obtained.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An optical connector ferrule for positioning and securing an optical fiber such that the optical fiber is joined with a mating optical fiber;
    said optical fiber connector ferrule being provided with an insert portion having an end face;
    said insert portion having an outside diameter D and being formed with a bore for positioning the optical fiber;
    said bore having a diameter d;
    wherein a slot having a depth c of 0.005 to 0.050 mm and a width b is formed on said end face such that the following equation is satisfied:

$$(d + 2 \times c) < b < (D/\sqrt{2}).$$

2. An optical connector ferrule for positioning and securing an optical fiber such that the optical fiber is joined with a mating optical fiber;
    said optical fiber connector ferrule being provided with an insert portion having an end face;
    said insert portion having an outside diameter D and being formed with a bore for positioning the optical fiber;
    said bore having a diameter d;
    wherein a circular recess having a depth c of 0.005 to 0.050 mm and a diameter b is formed on said end face such that the following equation is satisfied:

$$(d + 2 \times c) < b < (D/\sqrt{2}).$$

* * * * *